United States Patent [19]

Fair

[11] 4,406,345
[45] Sep. 27, 1983

[54] SEISMIC TRANSDUCER BASEPLATE AND HOUSING ASSEMBLY

[75] Inventor: Delbert W. Fair, Ponca City, Okla.

[73] Assignee: Conoco Inc., Ponca City, Okla.

[21] Appl. No.: 270,534

[22] PCT Filed: Aug. 8, 1979

[86] PCT No.: PCT/US79/00590

§ 371 Date: Apr. 8, 1981

§ 102(e) Date: Feb. 23, 1981

[87] PCT Pub. No.: WO81/00458

PCT Pub. Date: Feb. 19, 1981

[51] Int. Cl.³ .................. G01V 1/047; G01V 1/133
[52] U.S. Cl. .................................. 181/119; 367/189
[58] Field of Search ............. 181/114, 121, 113, 119, 181/401; 367/75; 248/310

[56] References Cited

U.S. PATENT DOCUMENTS

| | | | |
|---|---|---|---|
| 2,910,134 | 10/1959 | Crawford et al. | 181/401 X |
| 3,159,233 | 12/1964 | Clynch et al. | 181/401 X |
| 3,557,900 | 1/1971 | Kilmer | 181/117 |
| 3,983,857 | 10/1976 | Silverman | 181/114 X |
| 4,116,299 | 9/1978 | Martin | 181/401 X |
| 4,206,896 | 6/1980 | Cadillac et al. | 248/310 |

FOREIGN PATENT DOCUMENTS

WO81/00458 2/1981 PCT Int'l. Appl. .
WO81/00460 2/1981 PCT Int'l. Appl. .
WO81/00461 2/1981 PCT Int'l. Appl. .

Primary Examiner—Maynard R. Wilbur
Assistant Examiner—K. R. Kaiser
Attorney, Agent, or Firm—William J. Miller

[57] ABSTRACT

A lightweight rigid housing and baseplate structure for a seismic transducer. The baseplate (12) includes a central hub (26) for receiving a lower piston rod (76). Upper and lower skin plates (32 and 36) extend radially outward from the central hub (26). A plurality of equally angularly spaced reinforcing plates (40) also extend radially outward from the hub (26) and have their upper and lower edges rigidly connected to the upper and lower skin plates. A housing assembly (78) rigidly connects an upper piston rod (74) to the baseplate (12), and includes a frusto-conical section (82). The lightweight rigid housing (78) and baseplate (12) structure provides a seismic transducer having in-phase force distribution over substantially the entire area of the baseplate as it is engaged with the earth.

21 Claims, 5 Drawing Figures

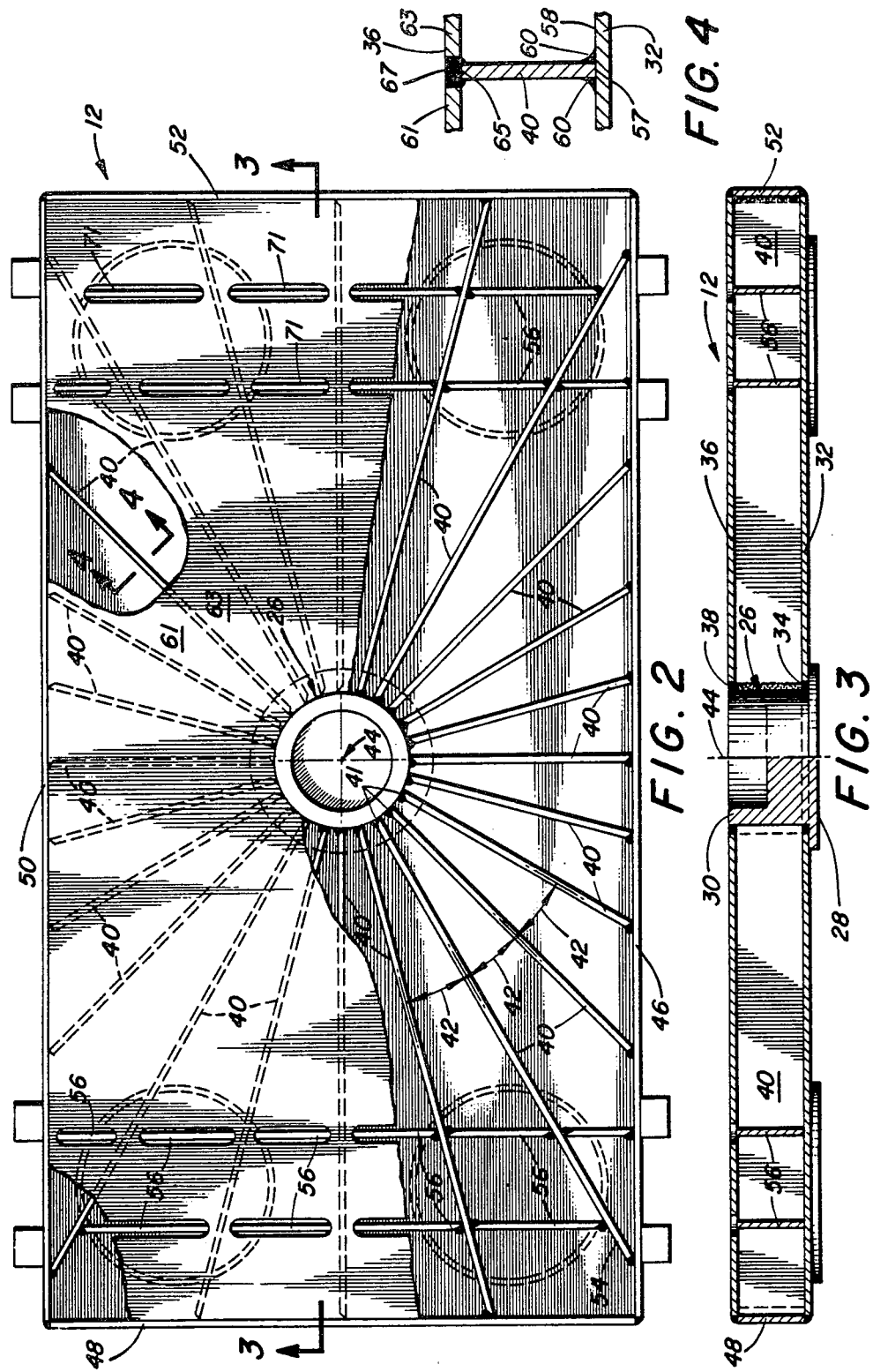

SEISMIC TRANSDUCER BASEPLATE AND HOUSING ASSEMBLY

DESCRIPTION

BACKGROUND OF THE INVENTION

1. Field of the Invention

This invention relates generally to transducers for inducing vibrational signals in an elastic medium, and more particularly, but not by way of limitation, it relates to an improved construction for a baseplate and housing assembly for a transducer especially suitable for generating relatively high frequency seismic waves in the earth.

2. Description of the Prior Art

A conventional seismic transducer of the prior art is illustrated in U.S. Pat. No. 3,745,885 to Fair et al., assigned to the assignee of the present invention. The Fair et al. device includes a baseplate, a reaction mass, and a double-rod-end piston disposed in a cylindrical bore of the reaction mass. The lower rod end is attached to the baseplate and the upper rod end is attached to an upper frame member that is also connected to the baseplate. Seismic transducers such as that shown in the apparatus of Fair et al. are generally designed for operation within the range of about 2-80 cycles per second. The present invention provides a housing and baseplate structure suitable for operation in a relatively higher frequency range, up to and exceeding approximately 250 cycles per second.

SUMMARY OF THE INVENTION

In a seismic transducer designed for relatively high frequency operation, there are two primary design parameters which must be optimized. First, it is necessary that the baseplate and housing structure be as lightweight as possible. Second, the baseplate and housing structure must also be kept as rigid as possible so that the dynamic force transmitted into the earth will be in phase over the entire baseplate contact area. The structure connecting the upper end of the piston shaft assembly to the baseplate must be of sufficient rigidity that forces transmitted from the upper end of the shaft remain in phase with forces transmitted into the baseplate from the lower end of the shaft.

The present invention achieves such a lightweight rigid housing and baseplate structure by providing a frame or housing made up of three sections. The first section includes a relatively small diameter flat plate bolted to the upper end of the piston shaft. The outer periphery of the flat plate is rigidly attached to the second housing section which comprises a frusto-conical section having a side angle of approximately 45° to the axis of the frusto-conical section. The lower end of the frusto-conical section is in turn rigidly attached to a cylindrical barrel section, the bottom end of which is rigidly attached to the baseplate. The baseplate includes a central hub to which the lower end of the piston shaft is rigidly connected. Upper and lower parallel skin plates extend radially outward from the upper and lower ends of the central hub and a plurality of stiffener plates extend radially outward from the central hub to provide a rigid baseplate assembly which will maintain in-phase force transmittal and holddown force distribution across the baseplate.

BRIEF DESCRIPTION OF THE DRAWINGS

FIG. 2 is a bottom view of the baseplate of the present invention showing the bottom skin plate partially cut away so that the stiffener plates may be easily viewed.

FIG. 3 is an inverted sectional elevation view of the baseplate assembly of FIG. 2 taken along line 3—3.

FIG. 4 is an inverted elevational sectional view of the baseplate of FIG. 2 taken along line 4—4 specifically showing the manner in which the stiffener plates and the upper and lower skin plates are assembled.

DETAILED DESCRIPTION OF THE PREFERRED EMBODIMENT

Figure 1:
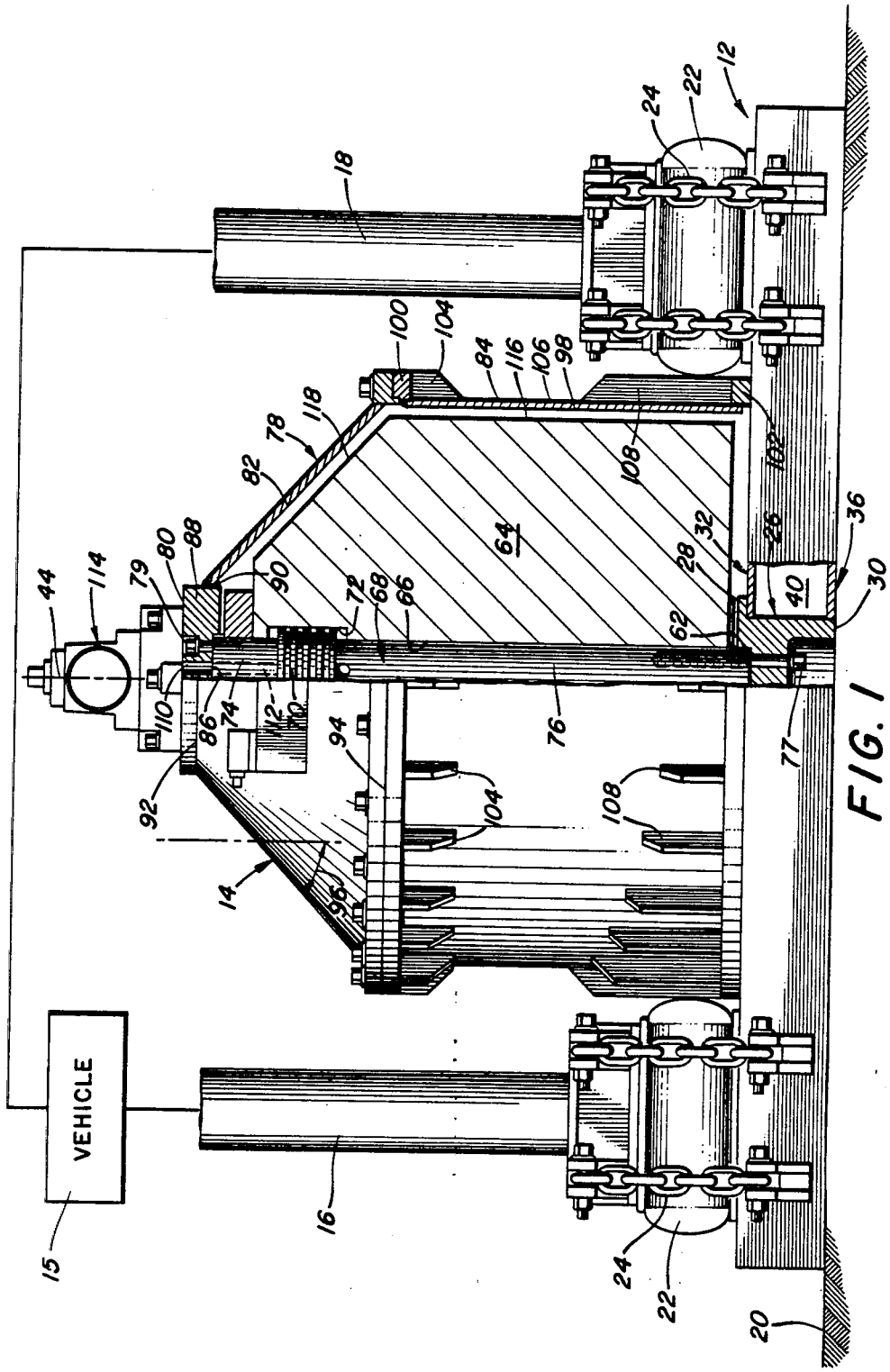
FIG. 1 is an elevational view with parts in section of the seismic transducer of the present invention.

Referring now to the drawings and particularly to FIG. 1, the seismic transducer apparatus of the present invention includes a baseplate 12 having a hydraulically powered vibrator assembly 14 mounted thereon.

The seismic transducer is generally attached to a vehicle 15, such as a large truck, by means of a plurality of extendable support columns 16 and 18 which provide a means for exerting a downward force on baseplate 12 to hold it in engagement with a ground surface 20. The extendable support columns 16 and 18 are resiliently mounted on baseplate 12 by vibration isolation structure such as airbags 22 and flexible retaining means 24, as is well-known in the art.

The construction of baseplate 12 is best shown in FIGS. 2 and 3. Baseplate 12 includes a central hub 26 having an upper end 28 and a lower end 30. A first upper skin plate 32 is rigidly attached to hub 26 at weld 34. A second lower skin plate 36 is rigidly attached to the lower end 30 of central hub 26 at weld 38. Lower skin plate 36 may be described as being parallel-spaced from upper skin plate 32.

A plurality of reinforcing members or ribs 40 have their inner ends 41 welded to central hub 26 and extend radially outward from central hub 26. Reinforcing ribs 40 are preferably spaced at equal angles 42 around the axis 44 of central hub 26. This assists in distribution of inphase dynamic forces from both ends of the piston shaft over the entire baseplate area in contact with the earth.

As best can be seen in FIG. 2, the upper and lower skin plates 32 and 36 are substantially rectangular in shape. A plurality of end plates 46, 48, 50 and 52 are rigidly connected about the periphery and to the upper and lower skin plates 32 and 36 by any usual means such as by welding. The upper and lower skin plates 32 and 36 and end plates 46, 48, 50 and 52 define an enclosed parallel-piped structure. The outer ends of reinforcing ribs 40 are also rigidly attached to one of the ends plates 46, 48, 50 or 52 as by welding, as shown for example at 54. Additional transverse reinforcing plates 56 are provided beneath opposite support columns 16 and 18.

The manner of fabricating the upper and lower skin plates 32 and 36, and the radially extending reinforcing ribs 40, is best illustrated in FIG. 4. The upper skin plate 32 is preferably a continuous member as illustrated in FIG. 4, with an upper edge 57 of reinforcing rib 40 butted up to the lower surface 58 of upper skin plate 32 and joined by welds 60.

The lower skin plate 36, however, is preferrably fabricated from plurality of pie-shaped pieces, 61 and 63 for example, which are spaced above a lower edge 65 of reinforcing plates 40. The pie-shaped pieces 61 and 63 are then welded to upper edges 65 of reinforcing ribs 40 as shown at 67. Slots 71 provide access for plug welding reinforcing plates 56 to the bottom surface 36.

Referring again to FIG. 1, vibrator assembly 14 consists of a reaction mass 64, to be further described, having a cylindrical bore 66 within which a double-rod-end piston 68 is disposed for reciprocal actuation. Such reaction mass configurations are well-known in the art of hydraulically driven seismic vibrators.

The double-rod-end piston 68 includes a piston 70 reciprocally disposed within a cylinder 72. Upper and lower piston rods 74 and 76, respectively, extend from piston means 70. Lower piston rod 76 has its lower end received within central recess 62 of central hub 26, and is secured to central hub 26 by bolts 77. The upper piston rod 74 is rigidly connected by bolts 79 to a reaction mass housing 78 which may be described as providing a means for rigidly connecting the upper piston rod 74 to the baseplate 12.

The housing 78 includes three sections 80, 82 and 84, and may also be described as a frame means. The first section 80 may be described as a flat plate section having a radially inner portion 86 rigidly secured to upper piston rod 74 by bolts 79. An outer portion 88 of plate section 80 is rigidly connected to second section 82, e.g. by welding, as indicated at 90. The second section 82 may be described generally as a frusto-conical section having a smaller diameter end 92 and a larger diameter end 94. Frusto-conical section 82 projects an angle 96 with a line parallel to central axis 44 of double-rod-end piston assembly 68. The angle 96 may vary with different designs, but preferably it is in the range of 40°–50° and optimally about 45°.

As the angle 96 is increased towards the maximum of 90° the construction of the frusto-conical section 82 approaches that of a complete flat plate section. A major problem with a completely flat section is that to achieve the necessary rigidity for high frequency operation that flat section would have to have a much thicker cross section and corresponding higher weight than is necessary with the frusto-conical section of the present invention. By providing the frusto-conical section 82, the forces from the upper piston rod 74 are transmitted to a large extent through compressional and tensional forces in the relatively thin plate making up frusto-conical section 82, as opposed to transmission almost entirely by bending forces within a flat plate section.

On the other hand, the angle 96 should not be made too small, because as the angle 96 decreases below 45° the necessary diameter of flat plate 80 increases. If the angle 96 were ultimately reduced to 0°, the design would once again have degenerated to that of a flat top section with a diameter approaching that of cylindrical section 84. It is for these reasons that the angle 96 is optimally chosen as approximately 45°.

The third section 84 of housing 78 is a generally cylindrical section including a cylinder 98 having upper and lower flanges 100 and 102, respectively. A first plurality of radially spaced reinforcing plates 104 are connected between an outer surface 106 of cylinder 98 and the upper end flange 100. Plates 104 reinforce flange 100 to prevent any significant radial expansion of cylindrical section 84, while also distributing stress from the flange weld sections. A second plurality of radially spaced reinforcing plates 108 are connected between outer surface 106 and the lower flange 102. These second plates 108 are of varying lengths so that the forces imposed at plates 108 on cylindrical section 84 are optimally distributed along the length of cylindrical section 84. Plates 108 also serve to dampen internal resonances within cylindrical section 84.

The upper flat plate section 80 of housing 78 would also include port passages, e.g. passage 110 disposed therethrough which connects a port passage 112 in piston rod assembly 68 from the lower end of cylinder 72 to a servo-valve assembly 114, and this may be described generally as a source of hydraulic fluid under pressure. Similar port means within rod assembly 68 (not shown) connect servo-valve 114 with the upper end of drive cylinder 72, i.e. above piston 70. Still other ports through plate section 80 and rod assembly 68 provide hydraulic fluid flow for the mass biasing and seal bleed-back functions as are well-known in the art, such ports not being specifically shown.

The reaction mass assembly 64 has a shape similar to the internal volume of housing 78 and is defined by a cylindrical portion 116 and a frusto-conical portion 118 extending from an end of cylindrical portion 116.

Figure 5:
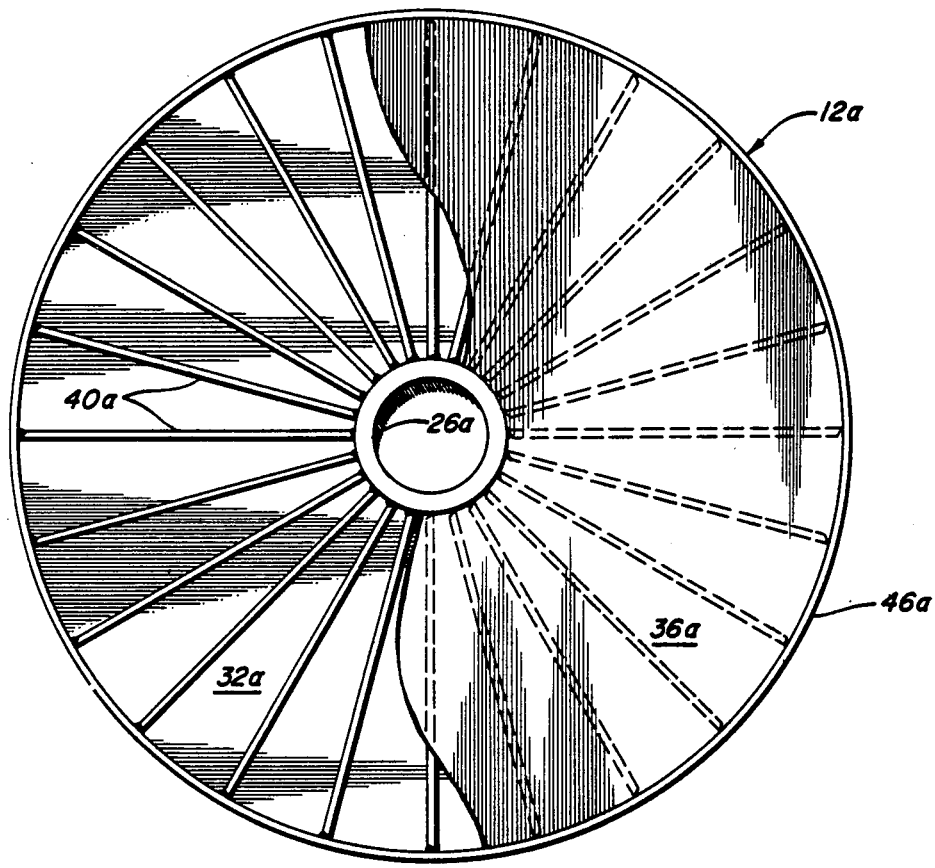
FIG. 5 illustrates a bottom view of another form of baseplate for use in the present invention.

FIG. 5 illustrates alternative structure which consists of a round plate 32a, lower skin plate 36a, radially extending reinforcing plates 40a, and a circular end plate 46a. To achieve uniform, in phase, force distribution across a baseplate, the circular design of FIG. 5 may be preferable to the rectangular design of FIG. 2. Other considerations, such as the ease of mounting the seismic transducer 10 on the vehicle 15, may however dictate the use of a rectangular baseplate.

The seismic transducer, and particularly the baseplate 12 and housing or frame 78, are specifically designed for operation within a wide frequency range up to and exceeding 250 cycles per second. In designing a transducer for operation in the higher seismic frequency bands, i.e. above about 80 cycles per second, an important design parameter is the natural frequency of the spring-mass system represented by the mass of the baseplate 12 and housing 78, and the spring constant of the trapped hydraulic fluid between servo-valve 114 and piston 70. That natural frequency should be above the operating frequency range.

This natural frequency is inversely proportional to the square root of the mass of baseplate 12 and housing 78, therefore the natural frequency can be raised by reducing the weight of those components.

Additionally, higher frequency operation increases the need for a rigid baseplate and housing to assure that forces transmitted through the baseplate and housing into the earth remain substantially in phase. It is desirable that there be a phase difference of no more than 90°, and preferably considerably less than that, across the entire area of baseplate 12 contacting the earth. Of course, the baseplate and housing must also be sufficiently strong to withstand the transmitted forces without structural failure.

Such a lightweight, rigid and strong baseplate and housing structure is provided by the present seismic transducer. In the operating range of about 250 cycles per second the displacement of baseplate 12 may be on the order of 0.006 thousandths of an inch peak to peak, depending on the earth medium under the baseplate. To maintain in-phase transmission of forces through housing 78, the allowable deflection within housing 78 is on the order of 1/10 or less of the displacement of baseplate 12. The necessary rigidity of housing 78 to achieve this small deflection is provided by the structure previously described, while a relatively low weight is also maintained. The necessary strength of housing 78 is provided through the use of high tensile steel. Similarly, the deflection within baseplate 12 should also be on the order of 1/10 or less of the displacement of baseplate 12.

Thus it is seen that the seismic transducer baseplate and housing assembly of the present invention achieves the objects and advantages mentioned as well as those inherent therein. While presently preferred embodiments have been described for the purpose of this disclosure, numerous changes and modifications may be made to those embodiments, which changes and modifications are included within the scope and spirit of the present invention as defined by the following claims.

The embodiments of this invention in which an exclusive property or privilege is claimed are defined as follows:

1. A transducer apparatus for inducing waves in an elastic medium, comprising: a baseplate means for engaging a surface of the elastic medium; a reaction mass having a cylinder bore extending therethrough; a double-rod-end piston, disposed in said bore so that said reaction mass is driven in reciprocation relative to said piston, a first rod end of said piston being rigidly connected to said baseplate means; and housing means for rigidly connecting a second rod end of said piston to said baseplate means, said housing means including a frusto-conical section having a smaller diameter end rigidly connected to said second rod end and a larger diameter end rigidly connected to said baseplate means.

2. The apparatus of claim 1, wherein said frusto-conical section comprises an angle in the range of about 40°–50° with a longitudinal axis of said piston.

3. The apparatus of claim 1, wherein said housing means further comprises a cylindrical section having a first end rigidly connected to said baseplate means and a second end rigidly connected to said larger diameter end of said frusto-conical section.

4. The apparatus of claim 3, wherein said cylindrical section includes: a cylinder; first and second radially outward extending flanges connected to said cylinder at said first and second ends, respectively, of said cylindrical section; and first and second pluralities of radial reinforcing plates connected between an outer surface of said cylinder and said first and second flanges, respectively.

5. The apparatus of claim 4, wherein said reinforcing plates of said first plurality of reinforcing plates are of varying lengths.

6. The apparatus of claim 3, wherein said frusto-conical section comprises an angle of approximately 45° with its longitudinal axis.

7. The apparatus of claim 3, wherein said housing means further comprises a plate section having a radially inner portion rigidly connected to said second rod end of said piston, and having an outer portion rigidly connected to said smaller diameter end of said frusto-conical section.

8. The apparatus of claim 7, wherein said plate section includes port means for communicating a source of hydraulic fluid under pressure to ports located in said double-rod-end piston.

9. The apparatus of claim 3, wherein said reaction mass has a shape defined by a cylindrical portion with a frusto-conical portion extending from an end of said cylindrical portion.

10. The apparatus of claim 9, wherein said frusto-conical portion of said reaction mass comprises an angle with its longitudinal axis substantially equal to the angle of said frusto-conical section of said housing means.

11. The apparatus of claim 1, wherein said baseplate means comprises: a hub means rigidly connected to said first rod end of said piston; first and second spaced parallel plates extending radially outward from said hub means; and a plurality of reinforcing plates extending radially from said hub means, said reinforcing plates being rigidly attached to said hub and each of said first and second spaced plates.

12. The apparatus of claim 11, wherein said radially extending reinforcing plates are equally angularly spaced about the axis of said hub means.

13. The apparatus of claim 11, wherein said baseplate means is further characterized as being a circular baseplate means.

14. The apparatus of claim 11, wherein said baseplate means is further characterized as being rectangular and as including first, second, third and fourth end plates rigidly connecting said first and second spaced plates to define an enclosed parallel-piped.

15. The apparatus of claim 1, wherein said housing means further comprises a plate section having a radially inner portion rigidly connected to said second rod end of said piston and having an outer portion rigidly connected to said smaller diameter end of said frusto-conical section.

16. A seismic transducer apparatus comprising: a baseplate means for engaging a surface of the earth and inducing seismic waves therein, said baseplate means being so constructed that dynamic forces transmitted from the transducer to the earth are substantially in phase over the entire baseplate area in contact with the earth, said baseplate means including: a central hub; first and second spaced skin plates extending radially outward from said central hub; and a plurality of reinforcing members extending radially from said hub, said reinforcing members being rigidly attached to said first and second spaced skin plates; a reaction mass having a cylinder bore extending therethrough; a double-rod-end piston, disposed in said cylinder bore so that said reaction mass is hydraulically driven in reciprocation relative to said piston, a first rod end of said piston being rigidly connected to said central hub; and frame means for rigidly connecting a second rod end of said piston to said baseplate means.

17. The apparatus of claim 16, wherein said frame means is further characterized as being a rigid frame means having a structural deflection less than about 1/10 of a displacement of said baseplate means at the high frequency end of the designated frequency range.

18. The apparatus of claim 16, wherein said baseplate means has a structural deflection less than about 1/10 of said displacement of said baseplate means at the high frequency end of the designated frequency range.

19. The apparatus of claim 16 or 17, wherein said frame means comprises a frusto-conical section having a smaller diameter end rigidly connected to said second rod end and a larger diameter end rigidly connected to said baseplate means.

20. The apparatus of claim 16, wherein said frame means comprises: a plate section rigidly connected to said second rod of said piston; a frusto-conical section having a smaller diameter end rigidly connected to said plate section; and a cylindrical section having a first end rigidly connected to said baseplate means and a second end rigidly connected to a larger diameter end of said frusto-conical section, said frame means being sufficiently rigid that forces transmitted from said second rod end of said piston, through said frame means, to said baseplate means are substantially in phase with forces transmitted from said first rod end of said piston to said baseplate means.

21. The apparatus of claim 16 which further includes: hold down means bearing upon opposite sides of said baseplate means first and second spaced skin plates; and transverse plate means disposed between said first and second spaced skin plates on said opposite sides of said baseplate means.

* * * * *